UNITED STATES PATENT OFFICE.

AUGUST EKLUND, OF SPOKANE, WASHINGTON.

CHEMICAL COMPOUND.

970,898.   Specification of Letters Patent.   Patented Sept. 20, 1910.

No Drawing.   Application filed March 15, 1909.   Serial No. 483,532.

*To all whom it may concern:*

Be it known that I, AUGUST EKLUND, a citizen of the United States, residing at Spokane, in the county of Spokane, and State of Washington, have invented certain new and useful Improvements in a Chemical Compound, of which the following is a specification.

This invention relates to a chemical compound of hydrogen peroxid and potassium nitrate, said compound being adapted for use in the purification of cream which has become over-ripe or tainted and whereby sweet and marketable butter may be made therefrom. It also renders butter fit for use which has become tainted from any cause.

The compound forming the subject matter of the present invention is made in the following manner preferably by way of illustration: Take 100 grams of water at the boiling point or 100 degrees centigrade and dissolve in the same 96 grams of potassium nitrate, and after the potassium nitrate is thoroughly dissolved the solution is permitted to cool to about 80 degrees. In this cooled solution are then placed four grams of hydrogen peroxid of 10 degrees strength. This combined solution is then placed in a shallow vessel and allowed to stand and cool for from twelve to fourteen hours. The liquid uncrystallized is then drained off and the remaining crystallized product is placed upon a clean sheet or cloth and allowed to dry perfectly.

In the preparation of cream which has become over-ripe, the cream is put into a churn and treated in the following manner: A wash made of luke warm or cool clear water and compound, prepared as above, in the proportion of twenty-five gallons of water to one-half pound of crystal is prepared. The cream is treated with its own weight of this solution or wash and let stand for about twenty-five minutes. If the temperature is suitable the cream is then churned in the usual manner. After churning the butter will be prepared or treated either in the ordinary manner without the purifier or may be treated with the purifier if desired.

In order to remove objectionable smell or taste in butter, the same is broken up finely, put into a churn and treated with its own weight of a solution prepared as stated just above in connection with the treatment of over-ripe cream. The butter thus treated is then given a number of turns in the churn so as to thoroughly cleanse or wash the same and left stand for a few minutes. The solution is then drained off and the butter treated or worked in the usual manner preferably by adding a little of the crystal with the salt with which it is being worked.

Butter made or treated in the manner above set forth is found by me to remain sweet and marketable for a much longer period of time than when not thus treated, and furthermore cream which otherwise would be wasted or useless may be utilized to advantage. Furthermore, there is nothing injurious to the health of the users of such butter treated as set forth above.

The above described crystal is identified as follows: 1. Blue coloration when added to KI and starch. 2. Discoloration of $KMnO_4$ in presence of $H_2SO_4$ under giving off of O. 3. Yellow precipitate with solution of titanic acid in presence of $SO_2$. 4. Blue coloration in oil solution of guaiacum mixed with infusion of malt. 5. Red coloration with ortol. 6. Blue coloration with tinct of guaiacum in presence of $FeSO_4$. 7. Blue coloration with $CrO_3$.

I do not wish to limit myself to a compound which is adaptable only as a purifier of cream and butter, and it will therefore be understood that the present invention is a new compound of $H_2O_2$ and $KNO_3$, which may be used for any desirable purpose.

Having thus described the best method or manner of carrying out the foregoing process now known to me, what I claim as new and desire to protect by Letters Patent of the United States is:

1. A chemical compound comprising crystals formed of $KNO_3$ and $H_2O_2$, said compound being identified as follows: blue coloration when added to KI and starch; discoloration of $KMnO_4$ in presence of $H_2SO_4$ under giving off of O; yellow precipitate with solution of titanic acid in presence of $SO_2$; blue coloration in oil solution of guaiacum mixed with infusion of malt; blue coloration with tinct. of guaiacum in presence of $FeSO_4$; and blue coloration with $CrO_3$.

2. The process of forming the above named compound comprising, dissolving $KNO_3$ in boiling water, allowing the mixture to cool, and adding a certain amount of $H_2O_2$ when the same reaches a predetermined temperature substantially as specified.

3. The process of forming the above mentioned compound comprising, dissolving 96 gr. of $KNO_3$ in 100 cc. of boiling water, allowing the mixture to cool to about 80° C. at which point 4 gr. of $H_2O_2$ at 10% strength are added, the mixture crystallizing on cooling.

In testimony whereof I affix my signature in presence of two witnesses.

AUGUST EKLUND.

Witnesses:
W. H. KEHOE,
CARL W. SWANSON.